United States Patent [19]

Slavens et al.

[11] 4,286,138

[45] Aug. 25, 1981

[54] WELDING METHODS AND APPARATUS INCLUDING ALTERNATE WELD METAL DEPOSITIONS ALONG OPPOSITE SIDES OF A WELD

[75] Inventors: Clyde M. Slavens; Edward A. Clavin, both of Houston, Tex.

[73] Assignee: Midcon Pipeline Equipment Co., Houston, Tex.

[21] Appl. No.: 62,685

[22] Filed: Aug. 1, 1979

[51] Int. Cl.³ .............................................. B23K 9/09
[52] U.S. Cl. ........................... 219/137 R; 219/125.12; 228/27
[58] Field of Search .................. 219/125.12, 130.51, 219/124.1, 137 R; 228/27

[56] References Cited

U.S. PATENT DOCUMENTS

| 3,264,445 | 8/1966 | Arnoldy | 219/125.12 |
| 3,396,263 | 8/1968 | Even et al. | 219/125.12 |
| 4,019,016 | 4/1977 | Friedman et al. | 219/130.51 |
| 4,151,395 | 4/1979 | Kushner et al. | 219/125.12 |
| 4,180,719 | 12/1979 | Lutz | 219/125.12 |

Primary Examiner—C. C. Shaw
Attorney, Agent, or Firm—Carl B. Fox, Jr.

[57] ABSTRACT

Welding methods and apparatus, wherein a welding electrode is oscillated by a motor-driven oscillator in back and forth movements transverse to a weld joint, and an alternating welding current is supplied to the welding electrode in timed relation with the welding tip oscillations so that weld metal is deposited along opposite sides of the weld joint in parallel paths without deposit of weld metal at the center of the weld joint.

19 Claims, 16 Drawing Figures

WELDING METHODS AND APPARATUS INCLUDING ALTERNATE WELD METAL DEPOSITIONS ALONG OPPOSITE SIDES OF A WELD

BACKGROUND OF THE INVENTION

In welding, of metal objects together, especially when an intentional gap is provided between the objects to be welded together to enable penetration of the weld completely through the depths of the objects, a considerable amount of weld metal passes through the gap between the objects, this being known as "blow through". Not only is weld metal wasted because of blow through, but the weld is rendered unattractive and rough because of formation of "cat's whiskers" of weld metal at the back side of the weld. In the case of pipe sections welded together end to end, such roughness and irregularity of the weld at the inside of the pipes causes flow and corrosion problems which cannot be tolerated. Grinding or other finishing operations at the inner side of the weld must be performed before the pipeline can be satisfactorily used to convey petroleum products.

To improve the qualities of such welds in pipelines, and to avoid the cost and trouble of finishing operations, this invention provides methods and apparatus whereby welds can be formed which are of improved appearance and smoothness at the back sides of the welds.

SUMMARY OF THE INVENTION

According to the invention, welding methods and apparatus are provided wherein the tip of the welding electrode is moved back and forth across the path of the weld in timed relationship with the welding current frequency, so that droplets of weld metal are discharged from the welding tip at the sides of the weld path, with little or none of the weld metal being discharged from the welding tip at the location of the weld joint, or at the gap if a gap is provided at the weld joint. In this manner, welds are made in which formation of cat's whiskers and other weld irregularities at the weld joint crack or gap are minimized or eliminated entirely.

Apparatuses are known in which the welding tip is moved back and forth across the weld path, i.e. the welding tip is oscillated or vibrated crossways of the weld path. Such apparatuses are shown in U.S. Pat. Nos. 2,093,881, 3,922,517, 1,956,406, 3,619,552, 2,405,761, 3,396,263, 3,328,556, 1,933,340, 2,280,770, 3,963,895, Russia No. 253974, and Japan No. 47-1082. None of the apparatuses or methods disclosed in these patents teaches use of a timed relationship between the back and forth movements and the discharge of weld metal droplets.

A principal object of the invention is to provide methods and apparatuses for welding wherein weld metal is discharged from a welding tip in timed relationship with oscillation of the welding tip. Another object of the invention is to provide such methods and apparatuses wherein the weld metal discharges occur when the welding tip is at the ends of its crossways movements or oscillations. A further object of the invention is to provide such methods and apparatuses wherein the number of discharges of weld metal at each side of the weld path can be controlled. Yet another object of the invention is to provide such methods and apparatuses wherein discharge of different numbers of weld metal droplets at opposite sides of the weld path can be achieved. Another object of the invention is to provide such methods and apparatuses which are economical and relatively simple in use, and which produce strong dependable welds of improved appearance and quality.

Other objects and advantages of the invention will appear from the following detailed descriptions of preferred embodiments, reference being made to the accompanying drawings.

DESCRIPTION OF THE PREFERRED EMBODIMENTS

Figure 1:
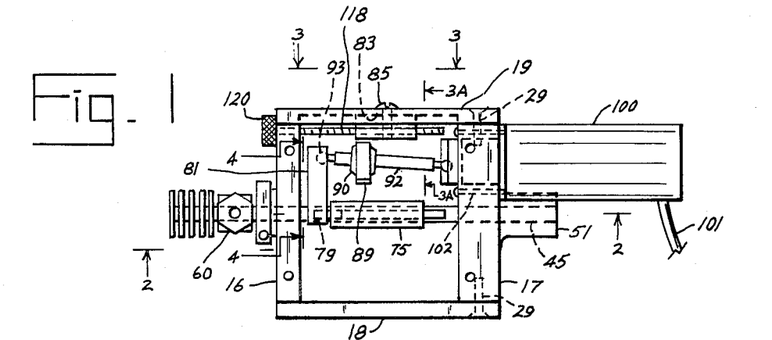
FIG. 1 is an upper plan view of the preferred form of apparatus according to the invention, the top plate or cover of the apparatus being removed.
Figure 2:
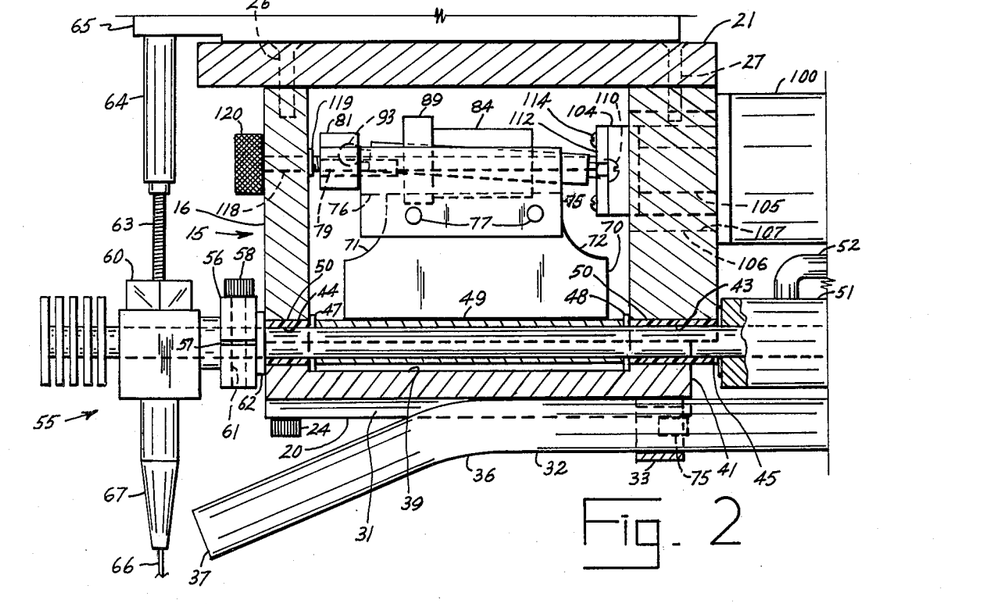
FIG. 2 is a vertical cross section taken at line 2—2 of FIG. 1.
Figure 7:
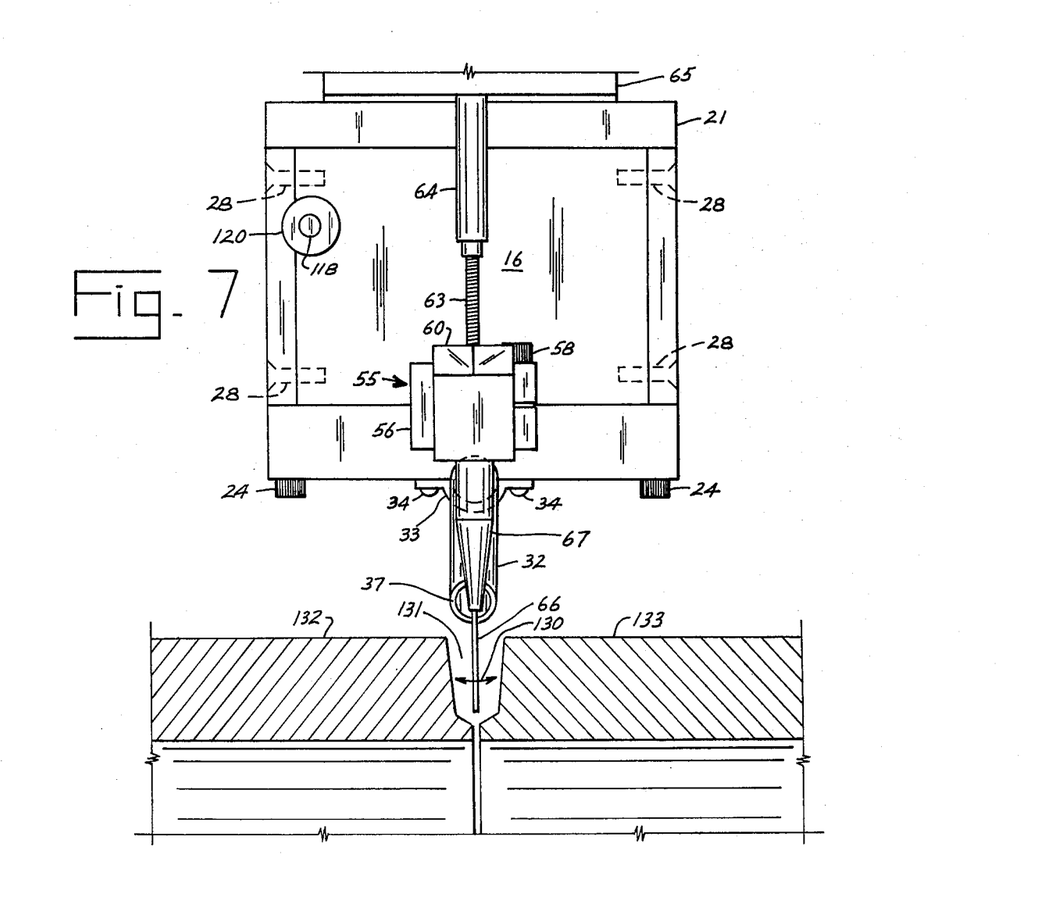
FIG. 7 is an elevation taken at the left end of the apparatus as shown in FIG. 1.

Referring now to the drawings in detail, and first to FIGS. 1, 2, and 7, the apparatus in a preferred form according to the invention includes a main housing 15 formed of metal plates 16–21. Plates 16–21 are assembled by screws, not all of which are shown. For example, plate 20 is connected to plates 16, 17 by screws 24, 25, respectively, and cover or top plate 21 is connected to plates 16, 17 by screws 26, 27, respectively. Side plates 18, 19 are connected to plates 16, 17 by screws 28, 29. Other screws may be used in similar manner for assembly of the housing as may be required.

The lower side of plate 20 forming the bottom of the housing has a semicircular groove 31 centered between its sides, in which is disposed a portion of a tube 32, as best shown in FIG. 2. Tube 32 is fixed in place adjustably by a semicircular strap 33 flanged at its opposite ends and connected to bottom plate 20 by screws 34 disposed in tapped openings in the lower side of plate 20. The positions of bend 36 and end 37 of tube 32 may be adjusted by loosening screws 34 and moving the position of the tube along groove 31. The angularity of bend 36 may be altered from the angularity shown in FIG. 2.

Plate 20 has a rectilinear recess or relief 39 which corresponds to the housing shape defined by walls 16–19. Plate 20 is inward of the outer side of plate 17 at end 41 of plate 20. A cylindrical bore 43 is formed half in plate 20 and half in plate 17. A cylindrical bore 44 of the same diameter and aligned with bore 43 is formed half in plate 20 and half in plate 16, as shown. A tube 45 of electrically conducting material such as copper is fitted through bores 43 44, and has washers 47, 48 and metal sleeve 49 therearound. Sleeves 50 insulate around tube 45 at bores 43, 44.

A connector fitting 51 is fixed to the righthand end of tube 45 as shown in FIG. 2, and electric welding current is supplied to tube 45 from a suitable welding current generator through conductor cable 52 which is joined to conductor tube 45 by fitting 51.

A welding torch 55 of conventional design, and which may be any suitable torch available in the art, is connected to the lefthand end of tube 45 as shown in FIG. 2. The connection to tube 45 is made by fitting 56, which has a cylindrical opening therethrough with a slot 57 at one side, screw 58 being disposed freely through a hole 60 above slot 57 and screwed into tapped opening 61 below slot 57, tightening of the screw tightening clamp fitting 56 about tube 45. A washer 62 spaces fitting 56 from plate 16.

Sleeve 63 of helically wound wire extends to tube 64 of welding wire feed 65, wire feed 65 being of any suitable form and being indicated schematically in the drawings. Welding wire or electrode 66 extends from wire feeder 65 through tube 64 and tube 63 through the torch, and extends out of torch tip 67 at the lower end thereof as shown.

Torch 55, as shown, is of the consummable electrode or MIG type, but other types of torches may be adapted for use with the invention, such as, for example, the TIG type of torch apparatus.

Sleeve 49 has welded or otherwise suitably affixed thereto a shaped plate 70 having part-circle cutouts 71, 72 at its opposite upper corners. A fitting 75 formed of insulating material is of outward rectilinear shape and has a slot 76 along its lower side which is fitted over the upper edge of plate 70 and secured by screws 77 passed through fitting 75 and plate 70. Fitting 75 carries a pin 79 which is engaged by toggle element 81, the engagement being pivotal.

Figure 3:
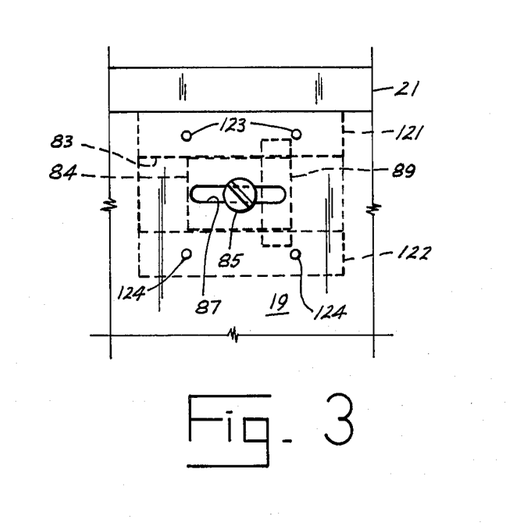
FIG. 3 is a partial elevation taken at line 3—3 of FIG. 1.
Figure 3A:
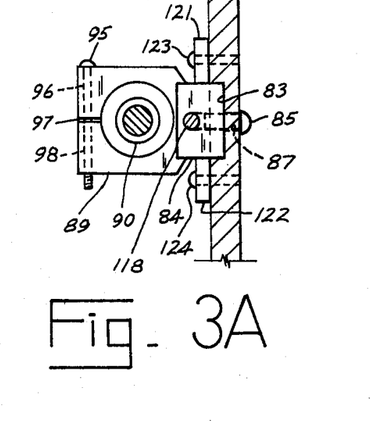
FIG. 3A is a partial vertical cross section taken at line 3A—3A of FIG. 1.

Plate 19 has a slot 83 at its inner side, shown in FIGS. 1, 3, and 3A. Block 84 is slidably disposed in slot 83 at one side of the block, being slidable longitudinally of the slot. Block 84 is held in slot 83 by screw 85 disposed through a slot through plate 19 indicated by reference numeral 87, the screw being engaged in a tapped opening in block 84 as shown. Screw 85 is slidable along slot 87 when block 84 slides along slot 83.

Block 84 carries element 89 in an opening through which a spherical bearing 90 is supported. A cylindrical shaft 92 is longitudinally slidably supported through bearing 90. The lefthand end of shaft 92, FIG. 1, is connected to toggle element 81 by spherical or ball connection 93 which forms the lefthand end of shaft 92. Element 89 and bearing 90 are movable along shaft 92 by movement of block 84. Bearing 90 is held in block 84 by tightening screw 95 which is disposed through a cylindrical passage 96 above slot 97 and is screwed into tapped opening 98 below slot 97, as best shown in FIG. 3A.

Figure 5:
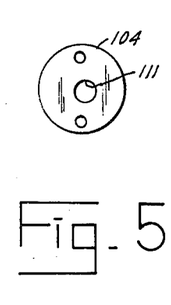
FIGS. 5-6 are elevations of elements of the apparatus shown in FIG. 1.
Figure 6:
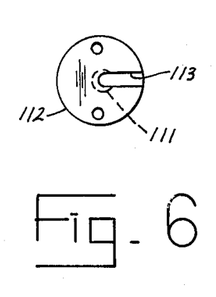

An electric motor 100 energized to operate through conductor cable 101 is affixed to the outer side of plate 17 by plural screws 102. Cylindrical element 104 is carried at the end of motor shaft 105 and rotates in bearing 106 lining cylindrical opening 107 through plate 17, opening 107 being concentric with the motor shaft. A ball joint fitting 110 forming the righthand end of shaft 92, FIGS. 1 and 2, is received in a hemispherical recess 111 in the face of element 104, recess 111 being eccentric with regard to the axis of element 104 as best shown in FIG. 5. A slotted circular plate 112 is fitted over the end of element 104 with the slot 113 disposed around the reduced portion of shaft 92 adjacent ball 110, and held in place by oppositely disposed screws 114 fitted through suitable openings through plate 112 and screwed into tapped openings of fitting 104.

Fitting 104 is rotated about its center by operation of motor 100. Ball 110 is moved circularly by rotation of fitting 104. Shaft 92 pivots at bearing 90, and the opposite end of shaft 92 is also moved circularly, the diameter of the circle of movement being adjustable by movement of bearing 90 when block 84 is moved along slot 83. Movement of block 84 along slot 83 is accomplished by rotation of screw 118, screw 118 not being moved longitudinally when rotated. Screw 118 has a split ring 119 disposed in a slot therearound adjacent the inner side of plate 16, and may be unthreaded at the portion thereof disposed through plate 16. A turning knob 120 is fixed to the end of screw 118 by means of which the screw is rotated to move block 84 in slot 83. Bars 121, 122 are fixed to plate 19 above and below block 84 by screws 123, 124, respectively, to stabilize the block.

Figure 4:
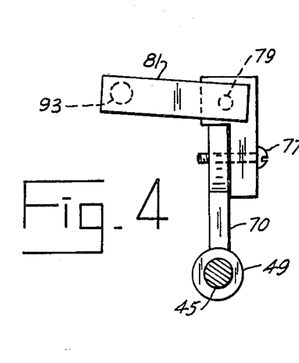
FIG. 4 is a partial elevation taken at line 4—4 of FIG. 1.

Referring now to FIG. 4, toggle element is pivotally connected to shaft 92 at ball 93, and at its other end is pivotally connected to pin 79 carried by fitting 75. When ball 93 is moved circularly by movement of the lefthand end of shaft 92 circularly as has been described, toggle element 81 is moved with a longitudinal component of movement to reciprocably move pin 79 and fitting 75. These movements cause movement of plate 70 in the same manner, and cause successive opposite rotations of sleeve 49 and tube 45 and torch 55 connected to tube 45. In other words, the torch is oscillated in opposite arcuate movements by operation of motor 100.

The apparatus is supported for movement along a weld path by any suitable apparatus. For example, the apparatus may be supported by a traveling carriage of the types shown in U.S. Pat. No. 4,092,928 and in application for Letters Patent Ser. No. 910,354, filed May 30, 1978. The weld path may be either straight or curved.

Movement of bearing 90 along shaft 92, as earlier stated, changes the sizes of the circular motion of ball 93. This change alters the extent of the longitudinal movements of toggle 81, and the angle through which the tube 45 and torch 55 are oscillated, and thereby the extent of the oscillations of the tip of welding electrode 66 at the weld path. The oscillation length of the electrode tip, and the portion of the weld path encompassed thereby, is adjusted so that the tip moves between positions close to one side of the weld path and positions close to the other side of the weld path, but without the tip touching either side of the weld path.

Referring to FIGS. 8A-8D and 9A-9B of the drawings, as well as to the other drawing figures, the welding electrode 66 is indicated to be moved in oscillating fashion between positions 128, 129 which represent the positions of farthest movement from the central position. The same movement is indicated by arrow 130 in FIG. 7, which also shows a welding gap or slot 131 between the stepwise beveled ends of pipes 132 and 133, which indicate one conventional form of welding gap, exaggerated however in width.

The electric current delivered to drive motor 100 in operation is controlled to further control the oscillations of the welding torch and welding electrode. Motor 100 is an electric motor the operation of which may be speed-controlled and on-off controlled by the electric current supplied to operate the motor. Means for this control of operation of motor 100 are known to the skilled artisan, and will not be further described. Any suitable control known in the art which will produce the desired results may be used in connection with the invention.

The motor 100 current is controlled with relation to the welding current supplied to torch 55. The welding current causes a weld metal droplet to be delivered from the welding electrode tip to the weld for each welding current pulse. The droplets, therefor, are delivered at a rate corresponding to the welding current frequency. If motor 100 is operated such that welding current pulses occur only when the tip is at one side or the other of the center of its oscillation movements, then weld metal droplets will be delivered only when the tip is at one side or the other of the weld path, and no weld metal droplets will be delivered when the tip is moving from one side of the weld path to the other side of the weld path. Preferably, weld metal droplet deliveries or emissions will be timed to occur when the welding tip is at the limit of its movement in each direction.

The apparatus may be controlled so that a predetermined number of weld metal droplets are emitted at the end of each crosswise movement of the welding electrode. The number of droplets emitted at the ends of the crosswise movements in the opposite directions may be the same or different. For example, the apparatus may be controlled such that ten metal droplets are deposited at one side and so that five droplets are deposited at the other side, for each back and forth movement of the electrode. The electrode is moved to one side of the weld path and dwells while ten metal droplets are deposited, and then is moved to the other side of the weld path and dwells while five metal droplets are deposited, and then is moved back to the first side of the weld path and dwells while ten metal droplets are deposited, and so forth through the number of cycles required to complete the weld. The welding electrode is, of course, at the same time also being moved along the length of the weld path by the carriage device or other moving support.

At the commencement of a weld, an initial longer dwell period may be provided at one or both sides of the weld path to permit heating of the metal of the objects being welded together from their initial cold conditions, and to build up an initial pool of molten metal at one or both of the opposite metal surfaces.

Figure 10:
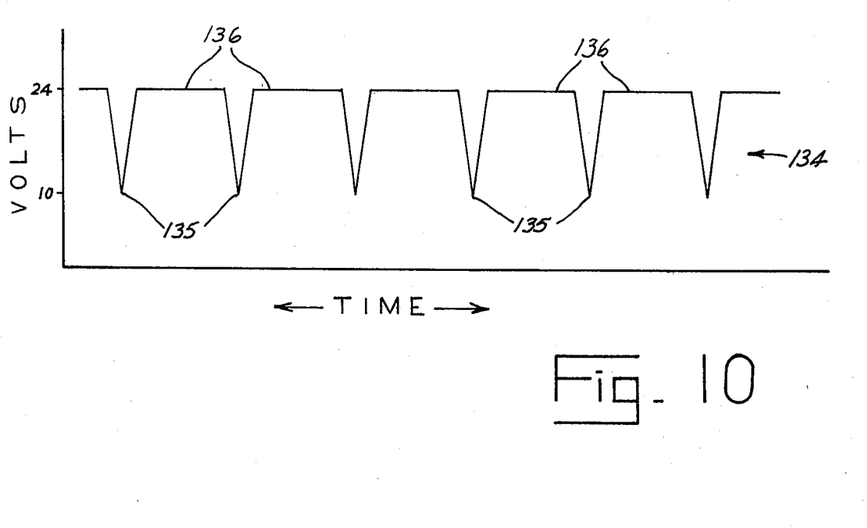
FIG. 10 is a diagram indicating the form of welding current preferred for use in connection with the invention.

As should be clear to those skilled in the art, the voltage of the welding current varies in the general manner indicated by FIG. 10. The welding current voltage indicated by curve 134 varies from lower voltages 135, for example, ten volts, to higher voltages 136, for example, twenty-four volts, the curve being of square wave form as shown. A droplet of weld metal is delivered from the tip of welding electrode 66 at each higher voltage phase of the curve 134, at which time a welding current pulse occurs.

Figure 11:
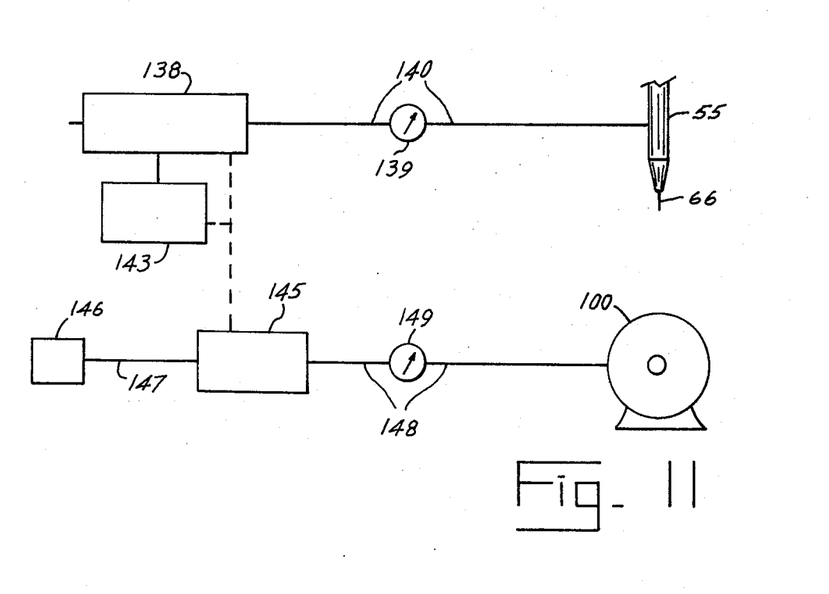
FIG. 11 is a schematic drawing indicating the controls necessary for operation of the apparatus and methods.

Element 138, FIG. 11, is a welding current generator of suitable form for supplying welding current to electrode 66. Frequency indicator 139 indicates the welding current frequency for the current flowing through cable 140 to torch 55. The welding current frequency is controlled by device 143. Indicator 139 and control 143 may be integrated into the generator 138. Element 145 controls the flow of electric current from source 146 through cables 147 and 148 to electric motor 100. An indicator 149 may be included in cable 148 to indicate when current energizing motor 100 to operate is flowing. Element 145 may be a switch device or other suitable control for starting and stopping flow of current to motor 100, so that operation of motor 100 will start and stop as required. As has been described, motor 100 is started to move electrode 66 from one side of the weld path to the other side of the weld path, the electrode movements being in timed relation to the welding current pulses delivered to torch 55, so that one or more current pulses occurs at one side of the weld path before the electrode 66 is moved to the other side of the weld path, and so forth, with current pulses occuring alternately at each side of the weld path to deposit droplets of weld metal alternately at each side of the weld path. It should be understood that motor 100 should preferably move electrode 66 between the opposite sides of the weld path rapidly, so that no or a minimum of weld metal droplets are discharged while the electrode is in motion from one side of the weld path to the other side of the weld path.

It will be realized that a motion of electrode 66 occurs for each 180 degree rotation of the shaft 105 of motor 100. Each 360 degree rotation of shaft 105 causes a complete back and forth movement of the electrode 66. Controllers 145 which can accomplish this type of operation of motor 100 in timed relation to the welding current pulses in cable 140 are well known to those skilled in the art in several forms, so that it is believed that no detailed description of controller 145 and its linkage to generator 138 and/or controller 143 is necessary. In point of fact, such control apparatus has been provided by a person skilled in the art without resort to anything beyond his ordinary skill in the art.

Referring now again to FIGS. 8A-8D and FIGS. 9A-9B, pipes 132, 133 disposed end to end in alignment around their peripheries are to be welded together around their peripheries at shaped gap 151 at which the two pipes are uniformly spaced apart. The pipes will usually be supported by an internal welding clamp device which is designed to align the pipe walls in circular form completely therearound. A track for supporting the carriage which moves torch 55 around the pipes will usually be affixed to the end of one of the pipes 132, 133 spaced axially from the welding gap 151.

Figure 8A:
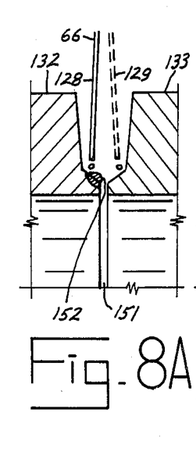
FIGS. 8A-8D are schematic views illustrating the preferred method according to the invention.
Figure 8B:
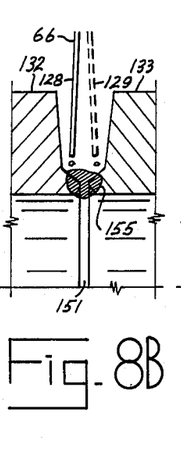

The torch 55, suitably supported, is disposed so that the tip of electrode 66 can be disposed within or adjacent gap 151. Delivery of welding current pulses by generator 138 is commenced, operating current to motor 100 being delivered to move electrode 66 to one side of the gap 151, but spaced from the gap wall, as at position 128. The electrode remains at position 128 until a predetermined number of weld metal droplets (one or more) has been deposited to form weld metal puddle 152, the size of which is exaggerated. After the predetermined number of droplets has been deposited at puddle 152, motor 100 is again operated to move electrode 66 to position 129 spaced from the opposite wall of gap 151, in which position of the electrode a predetermined number of droplets of weld metal is deposited at the other side of the gap 151. As electrode 66 is moved repeatedly back and forth between the opposite side of gap 151, with weld metal being deposited at each side of the gap, after each movement of the electrode, a larger puddle of weld metal 155 is formed, the underlying portion of the puddle penetrating the pipe end metal and solidifying into a weld bridging between the pipe ends across the gap. This initial weld, often called the root weld, should penetrate completely to the interiors of pipes 132, 133 to provide a smooth but somewhat bulging weld surface at the interiors of the pipes, as shown. The number of droplet emissions at the opposite sides of the gap may be altered as the weld is formed by appropriate adjustments of the controls 143, 145.

Figure 8C:
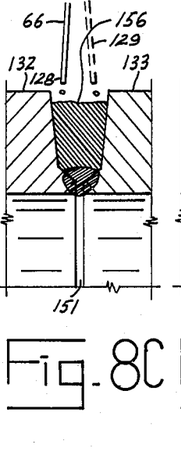

After the root weld 155 has been completed, the torch is reset or another torch substituted suitable for formation of a filler weld 156, which fills most of the remainder of gap 151 above weld 155, as shown in FIG. 8C. The welding torch and electrode movements are controlled as necessary to form the filler weld. Since gap 151 has been closed by root weld 155 prior to the formation of the filler weld 156, the filler weld may be accomplished without oscillation of the electrode tip and without timing of electrode tip movements with relation to the welding current pulses, if desired, although it is believed that superior weld qualities can be obtained using the apparatus and methods according to the invention.

Figure 8D:
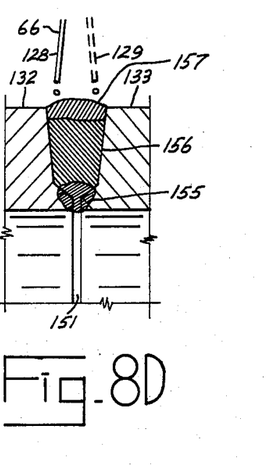

After the filler weld has been completed, a cap weld 157 is formed over the filler weld. The cap weld may be formed in the manner described for the root weld and filler weld, according to the invention, by oscillating the torch and welding electrode in timed relation to the welding current pulses, or the cap weld may be formed by any suitable conventional procedure, since there is no open gap remaining. Welding according to the instant invention provides advantages as to weld quality and appearance and is to be preferred.

It should be understood that the weld passes described are not intended to limit the invention. For welding thin metal plate and for welding pipe with thin walls, only one or two weld passes may be required. For thick plate and thick walled pipe, more than three weld passes may be required. The filler weld may be made in any number of overlaid passes.

It should also be understood that motor 100 may be operated in timed relation to the welding current pulse frequency to provide metal droplet disposition at intermediate points across the weld path. By control of the speed of motor 100, any number of metal droplets may be emitted during one swing of the electrode across the weld path in either direction. Control of motor 100 to accomplish this result is well within the ability of the skilled artisan.

Figure 9A:
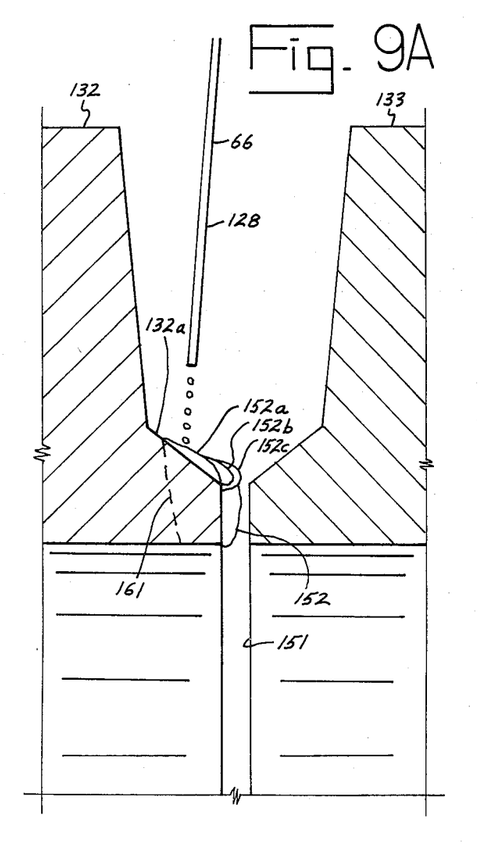
FIGS. 9A-9B are enlarged schematic views further illustrating the methods of the invention.
Figure 9B:
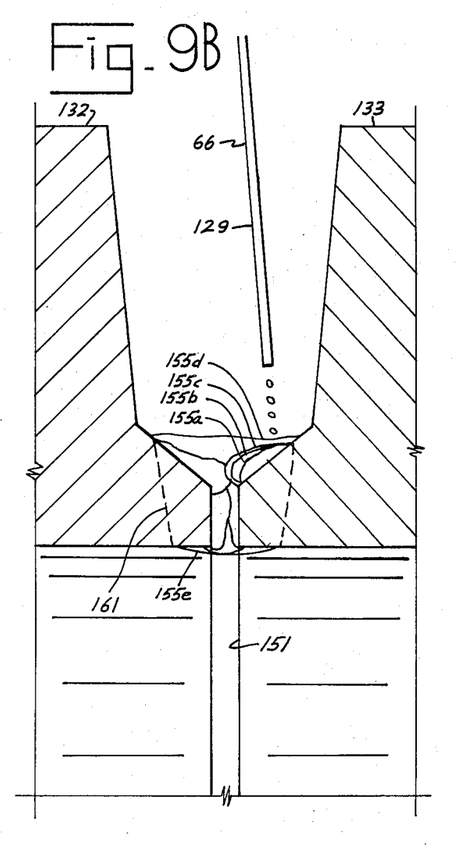

FIGS. 9A and 9B further illustrate the welding methods according to the invention. In FIG. 9A, electrode 66 is shown at the left side of the gap 151 between the ends of pipes 132, 133, and five droplets of weld metal are indicated as being discharged toward bevel shoulder 132a. Lines 152a, 152b, and 152c indicate the manner in which weld metal deposited at shoulder 132a spreads across the gap, line 152d indicating weld penetration by fusion of the pipe end metal caused by heat provided by the welding arc. The arc is indicated by reference numeral 160, and it should be understood that the welding arc is maintained continuously during welding. Shoulder 132a is melted by arc-produced heat at least to the location indicated by dashed line 161. In FIG. 9B the electrode 66 is shown at the righthand side of gap, the weld growing in a manner indicated by lines 155a, 155b, 155c, and 155d, until the root pass weld has been completed. Again, it should be understood that the root pass weld penetrates to the insides of the pipe walls, so that the inner side of the root pass is a somewhat humped formation as indicated by line 155e. Since there is little or no blowthrough of weld metal according to the process, the inner side of the weld is free of cat's whiskers and other distortions, and has a smooth contour which does not require use of finishing procedures before use of the pipeline as are generally required by other welding methods.

In one example of use of the method according to the invention, two sections of thirty inch (outside diameter) seamless steel pipe were welded together. The pipe ends were finished with facing stepped bevels similar to those shown in the drawings, but of narrower width. The gap at the inside was uniformly one-sixteenth inch. The gap at the outside was about five-sixteenths inch. A root pass was formed which was about one-eighth inch in thickness, after which the gap was filled with a filler pass to within about one-eighth inch of the outside of the gap. A cap or finish pass completed the weld, forming a slight hump outside of the outer pipe surfaces. At the inside of the root pass, a smooth hump approximately one-thirtysecondth inch in thickness and having a width of about three-eighths inch was formed, which did not require grinding or finishing in any manner to be suitable for use.

For the root pass, five droplets of weld metal were deposited at each side of the gap for each oscillation of the electrode, the same being used for the filler pass. The cap pass was formed with three droplets of weld metal deposited at each side of the center of the weld for each oscillation of the electrode. For all passes, five-thirty-secondths inch diameter steel welding wire was employed, the wire being bare but shielded by a stream of argon-carbon dioxide shielding gas during welding. The welding current was delivered at 125 volts for all passes, the pulse frequency being twenty-four pulses per second. The weld was completely satisfactory in every respect, and was sectioned for inspection which revealed no bubbles or irregularities at several locations around the weld.

The process has been operated with pulse frequencies from ten pulses per second up to fifty pulses per second, with uniformly good results. While these are considered the optimum frequencies, frequencies from 5–6 per second to 80–100 per second are believed usable. Motor 100, of course, is controlled to enable delivery of the required number of weld metal droplets at each side of the gap. For example, for a welding current having twenty-five pulses per second, and with five droplets to be deposited at each side of the gap, motor 100 must be operated to move back and forth, or oscillate with one movement in each direction, two and one-half times per second, with one-fifth second dwells at each side to permit deposition of five metal droplets at each side.

While preferred embodiments of the apparatus and methods have been described and shown in the drawings, many modifications thereof may be made by a person skilled in the art without departing from the spirit of the invention, and it is intended to protect by Letters Patent all forms of the invention falling within the scope of the following claims.

We claim:

1. Welding apparatus, comprising a welding torch having a welding electrode, said welding torch being supported for pivotal movement about an axis transverse to said welding electrode, drive motor means, arm means universally pivotally connected at one of its ends to an end of the rotating shaft of said drive motor means eccentrically of the axis of said rotary shaft and extending generally in the direction of said rotary shaft, toggle means universally pivotally connected at one of its ends to the other end of said arm means and pivotally connected at its other end to said torch eccentrically of said transverse axis, universal pivot support means fixing an intermediate point of said arm means against transverse movement in any direction but permitting pivotal movement of said arm about said point, operation of said drive motor means causing said one and other ends of said arm means to each be moved in circular motions about a line defined by the center of said rotary shaft and the center of said universal pivot support means, whereby operation of said drive motor means causes reciprocal pivotal oscillating back and forth movements of said welding torch and said welding electrode about said transverse axis.

2. The combination of claim 1, said universal pivot support means fixing an intermediate point of said arm means against transverse movement being adjustable longitudinally of said arm means to alter the amplitudes of said circular motions and the amplitude of said oscillating movements of said welding torch and said welding electrode.

3. The combination of claim 2, including means for supplying pulsating DC welding current to said welding electrode, and means for operating said drive motor means in response to pulses of said pulsating welding current to oscillate said welding torch and welding tip such that welding current pulses occur at the ends of the oscillatory back and forth movements of said welding electrode to deposit weld metal from said welding electrode only along parallel paths at opposite sides of a weld.

4. The combination of claim 3, said welding current pulses being of square wave form.

5. The combination of claim 2, said universal pivot support means for fixing an intermediate point of said arm means comprising spherical bearing means through which said arm means is slidably disposed, a fixture supporting said spherical bearing means for universal pivotal movement, slide means supporting said fixture disposed generally longitudinally of said arm means, and means for adjusting the position of said slide means longitudinally of said arm means.

6. The combination of claim 5, including means for supplying pulsating DC welding current to said welding electrode, and means for operating said drive motor means in response to pulses of said pulsating welding current to oscillate said welding torch and welding tip such that welding current pulses occur at the ends of the oscillatory back and forth movements of said welding electrode to deposit weld metal from said welding electrode only along parallel paths at opposite sides of a weld.

7. The combination of claim 6, said welding current pulses being of square wave form.

8. The combination of claim 1, including means for supplying pulsating DC welding current to said welding electrode, and means for operating said drive motor means in response to pulses of said pulsating welding current to oscillate said welding torch and welding tip such that welding current pulses occur at the ends of the oscillatory back and forth movements of said welding electrode to deposit weld metal from said welding electrode only along parallel paths at opposite sides of a weld.

9. The combination of claim 8, said welding current pulses being of square wave form.

10. The combination of claim 1, said universal pivot support means for fixing an intermediate point of said arm means comprising spherical bearing means through which said arm means is slidably disposed, a fixture supporting said spherical bearing means for universal pivotal movement, slide means supporting said fixture disposed generally longitudinally of said arm means, and means for adjusting the position of said slide means longitudinally of said arm means.

11. The combination of claim 10, including means for supplying pulsating DC welding current to said welding electrode, and means for operating said drive motor means in response to pulses of said pulsating welding current to oscillate said welding torch and welding tip such that welding current pulses occur at the ends of the oscillatory back and forth movements of said welding electrode to deposit weld metal from said welding electrode only along parallel paths at opposite sides of a weld.

12. The combination of claim 1, 2, 3, 4, 5, 6, 7, 8, 9, 10, or 11, said drive motor means being a speed-adjustable electric motor.

13. The combination of claim 1, 2, 3, 4, 5, 6, 7, 8, 9, 10 or 11, said welding electrode being a consummable electrode, said apparatus including means for feeding said consummable electrode through said welding torch.

14. The combination of claim 1, 2, 3, 4, 5, 6, 7, 8, 9, 10, or 11, said arm means having ball joint connection means providing said universally pivoted end connections thereof to said drive motor means shaft and to said one end of said toggle means.

15. The combination of claim 1, 2, 3, 4, 5, 6, 7, 8, 9, 10, or 11, including tubular electrical conductor means depending from said torch concentric with said transverse axis, said conductor means being journaled for rotation through opposite walls of a hollow housing enclosing said arm means, said toggle means, and said slide means, including plate means affixed along one edge to said conductor means within said housing, said other end of said toggle means being pivotally connected to said plate means eccentrically of said transverse axis.

16. Welding method, comprising supporting the welding electrode of a welding torch adjacent a joint between objects to be welded together, oscillating said welding electrode in back and forth motions across said joint by operation of a motor-driven oscillating means, moving said welding torch and electrode longitudinally of said joint, providing a pulsating welding current to said electrode and controlling the welding current pulse frequency thereof, and controlling the operation of said motor-driven oscillating means in response to the pulses of said welding current such that welding current pulses in controlled number occur at the ends of each said back and forth motions of said electrode, whereby weld metal droplets in controlled number are deposited only at opposite sides of said joint in parallel paths to flow together to form a weld across said joint, no weld metal droplets being deposited between said parallel paths.

17. Method according to claim 16, wherein said joint includes a uniform gap between said objects, and including controlling the amplitude of said back and forth oscillatory motions of said electrode whereby said parallel paths are disposed one on each of said objects at opposite sides of said gap whereby blow through of weld metal droplets through said gap does not occur.

18. Method according to claim 16 or 17, including controlling the amplitude of said back and forth oscillatory motions of said electrode whereby said electrode does not contact either of said objects during welding.

19. Method according to claim 16 or 17, including disposing said electrode in said gap without contact of said electrode with either of said objects during welding.

* * * * *